United States Patent
Wang

(10) Patent No.: US 12,184,654 B2
(45) Date of Patent: Dec. 31, 2024

(54) DYNAMIC RESOURCE GRANTING METHOD AND DEVICE IN COMMUNICATION SYSTEM, AND COMPUTER READABLE MEDIUM

(71) Applicant: Nokia Technologies Oy, Espoo (FI)

(72) Inventor: Zhi Wang, Shandong (CN)

(73) Assignee: Nokia Technologies Oy, Espoo (FI)

( * ) Notice: Subject to any disclaimer, the term of this patent is extended or adjusted under 35 U.S.C. 154(b) by 879 days.

(21) Appl. No.: 17/057,212

(22) PCT Filed: May 22, 2019

(86) PCT No.: PCT/CN2019/088010
§ 371 (c)(1),
(2) Date: Nov. 20, 2020

(87) PCT Pub. No.: WO2019/223731
PCT Pub. Date: Nov. 28, 2019

(65) Prior Publication Data
US 2021/0211427 A1    Jul. 8, 2021

(30) Foreign Application Priority Data
May 22, 2018 (CN) .......................... 201810497370.9

(51) Int. Cl.
| | |
|---|---|
| *H04L 9/40* | (2022.01) |
| *H04W 16/10* | (2009.01) |
| *H04W 24/08* | (2009.01) |

(52) U.S. Cl.
CPC ............. *H04L 63/10* (2013.01); *H04W 16/10* (2013.01); *H04W 24/08* (2013.01)

(58) Field of Classification Search
CPC ........ H04L 63/10; H04W 16/10; H04W 24/08
See application file for complete search history.

(56) References Cited

U.S. PATENT DOCUMENTS

| | | | |
|---|---|---|---|
| 2011/0137826 A1* | 6/2011 | West ...................... | G06Q 30/04 705/412 |
| 2011/0225311 A1* | 9/2011 | Liu ........................ | H04L 45/125 709/231 |

(Continued)

FOREIGN PATENT DOCUMENTS

| | | |
|---|---|---|
| CN | 102480711 A | 5/2012 |
| CN | 104219647 A | 12/2014 |

(Continued)

*Primary Examiner* — Dhairya A Patel
(74) *Attorney, Agent, or Firm* — McCarter & English LLC

(57) ABSTRACT

Embodiments of the present disclosure relate to methods, devices and computer-readable media for dynamic resource authorization in a communication network. According to embodiments of the present disclosure, a device in a vendor network dynamically transmits a request to a network device in the vendor network according to a resource usage state in an operator network. In addition, the vendor and an operator negotiate on charging, so that resource requests and allocation are more reasonable, and the resource usage rate is improved. Furthermore, according to embodiments of the present disclosure, the operator further negotiates with a user on charging, so that the user is able to request and utilize a resource in a better manner.

16 Claims, 6 Drawing Sheets

(56) References Cited

U.S. PATENT DOCUMENTS

| | | | |
|---|---|---|---|
| 2013/0159150 A1* | 6/2013 | Hao | G06Q 10/06 |
| | | | 709/224 |
| 2014/0376914 A1* | 12/2014 | Miniscalco | H04B 10/1129 |
| | | | 398/58 |
| 2015/0212755 A1* | 7/2015 | Asnaashari | G06F 11/1076 |
| | | | 711/103 |
| 2015/0339748 A1 | 11/2015 | Huo et al. | |
| 2016/0006883 A1 | 1/2016 | Cartmell | |
| 2016/0352924 A1 | 12/2016 | Senarath et al. | |
| 2017/0041394 A1* | 2/2017 | Mortazavi | G06F 3/0631 |
| 2017/0054855 A1* | 2/2017 | Huang | H04M 15/886 |
| 2017/0078157 A1 | 3/2017 | Zhang | |
| 2017/0223678 A1* | 8/2017 | Jalkanen | H04W 72/52 |
| 2017/0332274 A1 | 11/2017 | Link, II | |
| 2018/0077564 A1 | 3/2018 | Xu et al. | |
| 2018/0124254 A1* | 5/2018 | Shaw | H04L 12/1417 |
| 2018/0176845 A1* | 6/2018 | Visuri | H04W 36/0072 |
| 2018/0212787 A1* | 7/2018 | Lee | H04L 41/0836 |
| 2021/0306937 A1* | 9/2021 | Hua | H04W 8/183 |

FOREIGN PATENT DOCUMENTS

| | | |
|---|---|---|
| CN | 104995868 A | 10/2015 |
| CN | 107111597 A | 8/2017 |
| CN | 107995197 A | 5/2018 |
| EP | 2 959 633 A0 | 8/2014 |
| EP | 3 295 323 A | 12/2016 |
| WO | WO-2007/051140 A2 | 5/2007 |
| WO | WO-2017/197295 A1 | 11/2017 |

* cited by examiner

DYNAMIC RESOURCE GRANTING METHOD AND DEVICE IN COMMUNICATION SYSTEM, AND COMPUTER READABLE MEDIUM

CROSS REFERENCE TO RELATED APPLICATION

This patent application is a U.S. National Stage application of International Patent Application Number PCT/CN2019/088010 filed May 22, 2019, which is hereby incorporated by reference in its entirety, and claims priority to CN 201810497370.9 filed May 22, 2018.

FIELD

Embodiments of the present disclosure generally relate to communication technologies, and more specifically, to methods, devices and computer-readable media for dynamic resource authorization in a communication system.

BACKGROUND

With the development of communication technologies and cloud technologies, more and more network functions can be implemented on a cloud. For example, Network Functions Virtualization (NFV) technologies may implement network functions in software, which move network functions from dedicated hardware devices to software running on commercial hardware. With the development of the $5^{th}$-generation communication technology, technologies such as NFV play an increasingly critical role. Licensing is a very important part of the NFV technology. Licensing may enable VNF vendors to sell specific functions and/or services to network operators and may also limit throughput of operator networks. However, an on-demand licensing mechanism that may be used for NFV and other technologies has not yet been proposed.

SUMMARY

In general, embodiments of the present disclosure relate to a method for dynamic virtual resource authorization in a communication system and a corresponding network device.

In a first aspect, embodiments of the present disclosure provide a communication method. The method comprises: determining, at a first network device, a communication resource required by a network based on a current usage state of communication resources in the network. The method further comprises transmitting a request on the communication resource to a second network device, the request at least indicating an expected charge associated with the communication resource. The method further comprises receiving a response to the request from the second network device.

In a second aspect, the embodiments of the present disclosure provide a communication method. The method comprises: receiving, at a second network device, a request on a communication resource from a first communication device, the request at least indicating an expected charge associated with the communication resource, the communication resource being determined based on a current usage state of communication resources in a network. The method further comprises: transmitting a response to the request to the first network device based on the expected charge.

In a third aspect, the embodiments of the present disclosure provide a communication method. The method comprises: obtaining, at a third network device, a first charge for a communication resource. The communication resource is requested by a first network device to a second network device, the first charge being determined through a negotiation between the first network device and the second network device. The method further comprises obtaining charge configuration information of the first network device. The charge configuration information is related to a terminal device in a network. The method further comprises generating a second charge for the terminal device based on the first charge and the charge configuration information. The method comprises broadcasting the generated second charge to the terminal device.

In a fourth aspect, the embodiments of the present disclosure provide a network device. The network device comprises: at least one processor; and a memory coupled to the at least one processor, the memory storing instructions which, when executed by the at least one processor, cause the network device to perform a method according to the first aspect.

In a fifth aspect, the embodiments of the present disclosure provide a network device. The network device comprises: at least one processor; and a memory coupled to the at least one processor, the memory storing instructions which, when executed by the at least one processor, cause the network device to perform a method according to the second aspect.

In a sixth aspect, the embodiments of the present disclosure provide a network device. The network device comprises: at least one processor; and a memory coupled to the at least one processor, the memory storing instructions which, when executed by the at least one processor, cause the network device to perform a method according to the third aspect.

In a seventh aspect, the embodiments of the present disclosure provide a communication apparatus. The communication apparatus comprises means for performing a method according to the third aspect.

In an eighth aspect, the embodiments of the present disclosure provide a computer-readable storage medium. The computer-readable storage medium includes program codes stored thereon, the program codes, when executed by an apparatus, cause the apparatus to perform a method according to the first aspect.

In a ninth aspect, the embodiments of the present disclosure provide a computer-readable storage medium. The computer-readable storage medium includes program codes stored thereon, the program codes, when executed by an apparatus, cause the apparatus to perform a method according to the second aspect.

In a tenth aspect, the embodiments of the present disclosure provide a computer-readable storage medium. The computer-readable storage medium includes program codes stored thereon, the program codes, when executed by an apparatus, cause the apparatus to perform a method according to the third aspect.

It should be understood that what is described in the summary is neither intended to limit the key or essential features of exemplary embodiments of the present disclosure, nor to limit the scope of the present disclosure. Other features of the present disclosure will become apparent through the following description.

BRIEF DESCRIPTION OF THE DRAWINGS

The foregoing and other features, benefits, and aspects of various embodiments of the present disclosure will become more apparent from the following detailed description with reference to the accompanying drawings, where.

Throughout the drawings, the same or similar reference numerals represent the same or similar elements.

DETAILED DESCRIPTION

Figure 1:
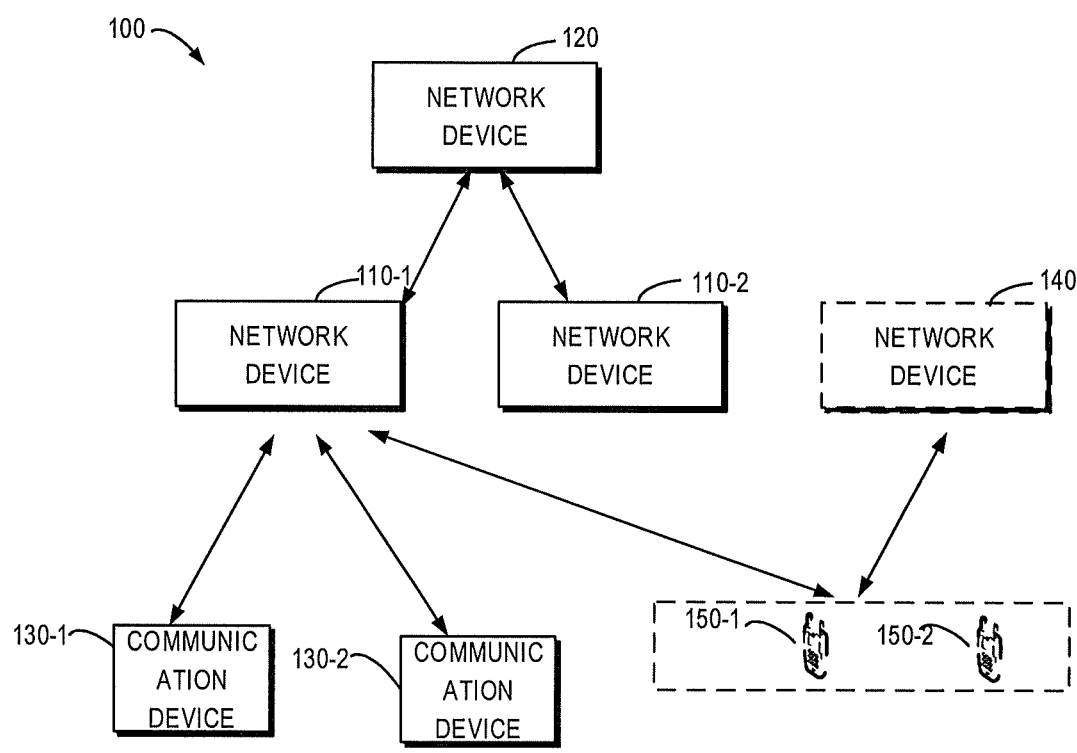
FIG. 1 shows a block diagram of an example communication system in which the embodiments described in the present disclosure may be implemented.

Embodiments of the present disclosure will be described in more detail with reference to accompanying drawings, where some embodiments are illustrated. However, it should be understood that the present disclosure may be implemented in various ways and should not be construed as being limited to the embodiments illustrated herein. On the contrary, these embodiments are provided for a more thorough and complete understanding of the present disclosure. It should be understood that the drawings and embodiments of the present disclosure are only for the purpose of illustration, rather than limiting the scope of the present disclosure.

The term "circuitry" used herein refers to one or more or all of the following:

(a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all use cases of this term in this application (including in any claims). As a further example, the term "circuitry" used herein also covers an implementation of only a hardware circuit or a processor (or multiple processors), or a portion of a hardware circuit or a processor, and its (or their) accompanying software and/or firmware. The term "circuit" also covers, for example, and if applicable to a particular claim element, a baseband integrated circuit or a processor integrated circuit, or OLT, DPU or similar integrated circuits in other computing devices.

The term "network device" used herein refers to any appropriate entity or device that can provide cells or coverage, so that a terminal device may access a network through the network device or receives services from the network device. An example of network devices may include, for example, a base station. The term "base station (BS)" used herein may represent a node B (NodeB or NB), an Evolved Node B (eNodeB or eNB), a gNB, a remote radio unit (RRU), a radio-frequency head (RH), a remote radio head (RRH), a repeater, an access point (AP), or a low power node such as a Picocell, a Femto cell and the like.

The term "terminal device" or "user equipment" (UE) used herein refers to any entity or device that can perform wireless communication with the network device or one another. As an example, the terminal device may comprise a mobile terminal (MT), a subscriber station (SS), a portable subscriber station (PSS), a mobile station (MS) or an access terminal (AT), the above on-board devices, and a machine or an electric appliance with communication functionality.

The term "communication device" used herein may refer to a "network device" and/or a "terminal device."

The terms "comprise", "include" and their variants used herein are to be read as open terms that mean "include, but is not limited to". The term "based on" is to be read as "based at least in part on". The term "one embodiment" is to be read as "at least one embodiment"; the term "another embodiment" is to be read as "at least one other embodiment". Definitions of other terms will be presented in the description below.

The term "communication resource" used herein may refer to any resource that is used for performing communication. For example, "communication resources" may include, but are not limited to, computing resource(s) for processing communication, storage resource(s), time-frequency resource(s), and the like.

As described above, an on-demand licensing mechanism that may be used for technologies like NFV has not been proposed yet. In traditional technologies, licenses offered by vendors to operators are usually static. However, the current software licensing mechanism is static. It only provides a protection mechanism for VNF that enables an operator to buy the license to unlock a specific function/service, capacity limitation and the like. There is still no solution to support on-demand dynamic licenses. The licensing mechanism in traditional technologies may cause the following problems: for operators, they cannot request dynamic licenses based on their real needs; for vendors, they cannot obtain subsequent remuneration for sales. Therefore, there is a need for dynamic licensing technology so as to at least partly solve the above problems.

FIG. 1 illustrates an example block diagram of a communication system 100 in which the embodiments of the present disclosure may be implemented. The communication system 100 may comprise network devices 110-1 and 110-2 (collectively referred to as "network device(s) 110"), a network device 120 and communication devices 130-1 and 130-2 (collectively referred to as "communication device(s) 130"). It may be understood that the communication system 100 may comprise any appropriate number of network devices 110, network devices 120 and communication devices 130. Embodiments of the present disclosure are not limited in this regard. The communication system 100 may further comprise other network devices such as a network device 140. In some embodiments, the communication device 130 may be a terminal device. Alternatively or in addition, the communication device 130 may also be a network device that provides specific services in an operator network. Both the communication device 130 and the first network device 110 reside in an operator network. The second network device 120 may reside in a vendor network. Additionally or alternatively, the communication system 100 may further comprise terminal devices 150-1 and 150-2 (collectively referred to as "terminal device(s) 150"). It may be understood that the communication system may comprise any suitable number of terminal devices 150. The terminal device 150 may communicate with the network device 110 and the network device 140. It may be understood that if the communication device 130 is a terminal device, the communication device 130 may refer to a terminal device that is same as or different from the terminal device 150. It should be noted that the numbers of the network devices 110, the network devices 120, the communication devices 130, the network devices 140 and the terminal devices 150 are exemplary and not limiting.

According to embodiments of the present disclosure, a dynamic on-demand licensing technology is proposed. The network device 110 (referred to as "first network device 110" hereinafter) in the operator network may dynamically transmit a request to the network device 120 (referred to as "second network device 120" hereinafter) in the vendor network according to resource usage conditions in the operator network. In addition, the first network device 110 and the second network device 120 may negotiate on the charge of resources, so that the operator and vendor may request and allocate resources more reasonably.

In some embodiments, information on dynamic on-demand resource licensing may be pre-configured to the first network device 110 and the second network device 120 and stored in a local storage device. In addition or alternatively, the first network device 110 and the second network device 120 may download the information on dynamic on-demand resource licensing from a remote storage device. It may be understood that the embodiments of the present disclosure are not limited in this aspect. Table 1 shows example information on dynamic on-demand resource licensing. It should be understood that all data in Table 1 is exemplary and not limiting.

TABLE 1

|  | Negotiable Field | Acceptable Range | Negotiation Step | Max Negotiation Round |
|---|---|---|---|---|
| First network device 110 | Charging rate | 1.2-1.5 (¥/M) | 0.1 (¥/M) | Blank |
| Second network device 120 | Charging rate | 1.8-1.4 (¥/M) | 0.2 (¥/M) | Blank |

The "charging rate" in the "negotiable field" shows that the charting rate is negotiable between the first network device 110 and the second network device 120. The "negotiable field" may further comprise time periods of resource requests, quantities of resource requests, and other information.

"1.2-1.5 ($/M)" shows that a range from 1.2 yuan per megabits (¥/M) to 1.5 ¥/M is acceptable to the first network device 110. This means that the first network device 110 may start negotiation on a price from 1.2 ¥/M and may accept the highest charging price of 1.5 ¥/M. "1.8-1.4 (¥/M)" shows that a range from 1.8 ¥/M to 1.4 ¥/M is acceptable to the second network device 120. This means that the second network device 120 may start negotiation on a price from 1.8 ¥/M and may accept the lowest charging price of 1.4 ¥/M.

"0.1 ¥/M" in "negotiation step" indicates that in each round of negotiation, the first network device 110 increases the negotiation price by 0.1 ¥/M, and the second network device 120 decreases the negotiation price by 0.2 ¥/M. The "max negotiation round" indicates the number of rounds for price negotiation. If the max negotiation round is blank, this means that negotiation proceeds between the first network device 110 and the second network device 120 until both parties agree on the price. It should be understood that the information on dynamic on-demand resource licensing as shown in Table 1 is merely exemplary and not limiting.

Figure 2:
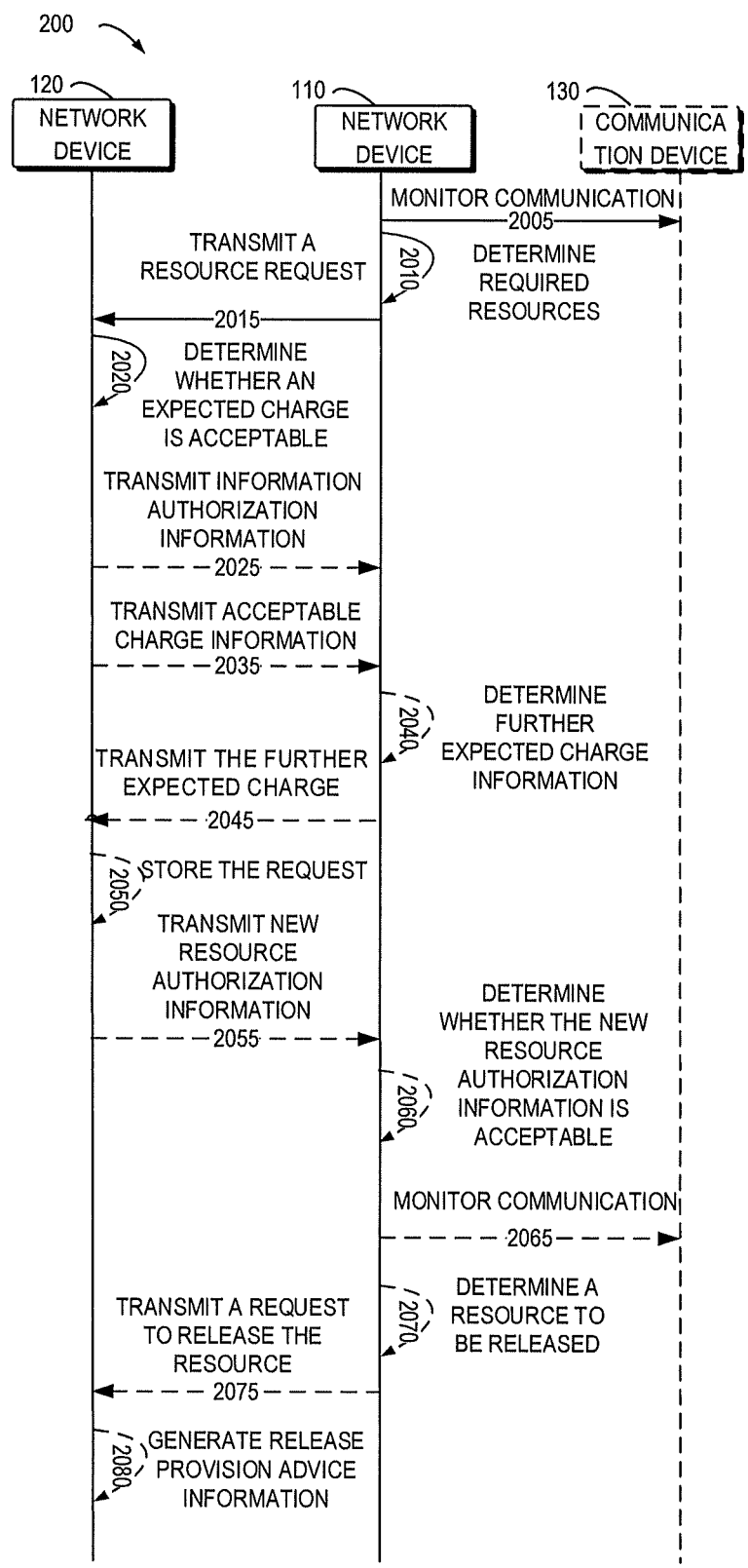
FIG. 2 shows an interaction diagram of an example method according to some embodiments of the present disclosure.

FIG. 2 illustrates a schematic diagram of interactions 200 according to embodiments of the present disclosure. The first network device 110 monitors 2005 the communication situation in the network and determines 2010 a required resource. As described above, the information on dynamic on-demand resource licensing may be configured to the first network device 110. In some embodiments, the information on dynamic on-demand resource licensing may further comprise condition information for triggering the first network device 110 to request a resource. For example, the condition information may comprise a relationship between current traffic of the network and predetermined throughput of the network. In this way, the first network device 110 may dynamically request the resource on demand based on the real situation in the operator network, thereby avoiding an unnecessary resource waste.

Only as an example, if the first network device 110 monitors the traffic of the communication device 130 in the network and determines that the current traffic is larger than the predetermined throughput, the first network device 110 may triggers a resource request so as to satisfy the traffic in the network. In some embodiments, if a difference between the traffic of the communication device 130 and the predetermined throughput is larger than a certain threshold, then the first network device 110 may trigger the resource request. Alternatively or additionally, in other embodiments, the communication device 130 may request a certain service and/or function from the first network device 110. If the first network device 110 currently cannot support the service and/or function, the first network device 110 may trigger a request for the service and/or function to the second network device 120.

The first network device 110 transmits 2015 a resource request to the second network device 120. The resource request may comprise expected charging information of the first network device 110. For example, the resource request may comprise 1.2 ¥/M, which indicates that the expected charge for the requested resource of the first network device 110 is 1.2 ¥/M. In some embodiments, the resource request may comprise valid time of the request.

As described above, in some embodiments, if the first network device 110 monitors the traffic of the communication device 130 in the network and determines the current traffic is larger than the predetermined throughput, the first network device 110 may trigger a resource request, and the first network device 110 transmits 2015 the resource request that may comprise channel predetermined throughput to the second network device 120. Alternatively or additionally, in other embodiments, the communication device 130 may request a certain service and/or function from the first network device 110. If the first network device 110 currently cannot support the service and/or function, the resource request transmitted from the first network device 110 to the second network device 120 may comprise an identity of the service and/or function.

The second network device 120 may determine 2020 whether the expected charge indicated in the resource request is acceptable or not. For example, the lowest acceptable charging rate of the second network device 120 is 1.4 ¥/M. If the expected charge is larger than 1.4 ¥/M, the expected charge is acceptable. The second network device 120 may transmit 2025 resource authorization information to the first network device 110. In some embodiments, even if the expected charge is larger than the lowest acceptable charging rate, the second network device 120 may not transmit authorization information but trigger the negotiation process to obtain a higher charge.

In some embodiments, the resource authorization information may comprise a license key. For example, the first network device 110 may unlock the requested service and/or function based on the resource authorization information. In other embodiments, the first network device 110 may increase its throughput based on the resource authorization information.

If the second network device 120 determines 2020 that the expected charge indicated in the resource request is unacceptable, the second network device 120 may transmit 2035 its acceptable charging information to trigger the charge negotiation process. In some embodiments, the second network device 120 may determine its acceptable charging information based on the information on dynamic on-demand resource licensing and transmit 2035 the acceptable charging information to the first network device 110. For example, the second network device 120 may transmit charging information of 1.8 ¥/M to the first network device 110. It may be understood that the second network device 120 may transmit the resource authorization information or the acceptable charging information according to the expected charge. The order shown in FIG. 2 is merely exemplary and not limiting. Embodiments of the present disclosure are not limited in this aspect.

In some embodiments, the first network device 110 may determine, based on the information on dynamic on-demand resource licensing, whether the charging information sent by the second network device 120 is acceptable. If the charging information is unacceptable, the first network device 110 may determine 2040 a further expected charge. As described above, the information on dynamic on-demand resource licensing may comprise the negotiation step. Only as an example, if the charging information sent by the second network device 120 is 1.8 ¥/M, the first network device 110 may determine that the charging information is unacceptable, and determine based on the negotiation step 0.1 ¥/M that a further expected charge is 1.3 ¥/M. The first network device 110 may transmit the further expected charge (1.3 ¥/M) to the second network device 120. Alternatively, if the further expected charge is unacceptable, the first network device 110 may abandon requesting the resource.

The second network device 120 may store 2050 a resource request transmitted by the first network device 110. In other embodiments, the second network device 120 may determine whether the further expected charge is acceptable or not. If the further expected charge is unacceptable, the second network device 120 may determine second acceptable charging information. For example, the second network device 120 may determine that the second acceptable charging information is 1.6 ¥/M, based on acceptable charging information and the negotiation step.

The second network device 120 may transmit 2055 new resource authorization information. The new resource authorization information may indicate the second acceptable charging information. The first network device 110 may determine 2060 whether the new resource authorization information is acceptable or not. For example, the first network device 110 may determine whether the second acceptable charging information of 1.6 ¥/M is acceptable or not. If the first network device 110 determines that the second acceptable charging information is unacceptable, the first network device 110 may determine that a third expected charge is 1.4 ¥/M based on the negotiation step. In some embodiments, the first network device 110 may transmit the third expected charge 1.4 ¥/M to the second network device 120. In this example, the second network device 120 may determine that the third expected charge 1.4 ¥/M is acceptable, and transmit resource authorization information based on the charge. In this way, the first network device 110 and the second network device 120 may negotiate on the charge, so that a charge that is acceptable to both the first network device 110 and the second network device 120 may be authorized.

Alternatively or in addition, the first network device 110 and/or the second network device 120 may judge whether to terminate the negotiation depending on whether the number of negotiation rounds reaches the predetermined number. For example, if the first network device 110 and/or the second network device 120 is pre-configured with 3 for the number of negotiation rounds, then after the third negotiation, the negotiation is stopped no matter whether the negotiation succeeds or not.

In an example embodiment, the first network device 110 may further monitor 2065 the communication situation in the network. If the first network device 110 determines that the traffic of the communication device 130 in the network has decreased, the first network device 110 may determine 2070 a to-be-released resource based on the current traffic in the network and the predetermined network throughput. In other embodiments, the first network device 110 may determine a currently unnecessary service and/or function. The first network device 110 may transmit 2075 a request to release a resource. In this way, the first network device 110 may release unnecessary resources so as to reduce costs. Alternatively or in addition, the first network device 110 may automatically release resources within a predetermined time.

In some embodiments, the second network device 120 may generate 2080 resource provisioning advice information based on stored historical resource request information. The historical resource request information may comprise, but is not limited to, one or any combination of: an expected charge for a resource request, the quantity of requested resources, and the frequency of requests. It may be understood that the historical resource request information may comprise any appropriate parameters. Only as an example, if the number of requests of the first network device 110 to increase the throughput exceeds a predetermined threshold, the second network device 120 may generate resource provisioning advice information. The resource provisioning advice information may comprise, but is not limited to, the quantity of resources, a charge for the resource and so on. The first network device 110 and the second network device 120 may also negotiate on the resource charge in the resource provisioning advice. It may be understood that the resource provisioning advice may comprise any appropriate resource-related parameters. The first network device 120 may determine whether to accept the advice according to the quantity of resources and charge in the resource provisioning advice.

In some embodiments, the second network device 120 may also generate resource provisioning advice that comprises an additional condition. For example, although the acceptable lowest charge of the second network device 120 is 1.4 ¥/M as shown in Table 2, the second network device 120 may also accept a charge lower than 1.4 ¥/M under certain conditions. As an example only, if the second network device 120 determines that its resource usage rate is lower than a predetermined threshold, the second network device 120 may also accept a charge lower than 1.4 ¥/M. As another example, the second network device 120 may also generate resource provisioning advice with respect to a specific date. For example, the second network device 120 may accept a price lower than 1.4 ¥/M in the last week of every month, and transmit to the first network device 110 the additional condition that the price is only applicable in the last week of every month.

As shown in FIG. 1, the communication system may further comprise a third network device 140. In some embodiments, the third network device 140 may determine a charge with respect to the communication device 130 according to resource charging information between the first network device 110 and the second network device 120 and charge configuration information of the first network device 110. The charge configuration information of the first network device 110 may comprise an operator cost, terminal user charging information (for example, discount information) and so on. Table 2 shows example resource charging information between the first network device 110 and the second network device 120. It should be understood that values shown in Table 2 are exemplary and not limiting. It may be understood that the resource charging information between the first network device 110 and the second network device 120 may further comprise any other charging-related information, such as charging information related to geographical location information.

TABLE 2

| Time | Traffic | Charge |
|---|---|---|
| 6:00-22:00 | 100 Gb | 100 ¥ |
| 22:00-6:00 | 60 Gb | 30 ¥ |

Table 2 shows an example where since 22:00-6:00 is an off peak period, the second network device 120 charges the first network device 110 a lower fee. The third network device 140 may determine the charging information with respect to the terminal device 150 based on the information in Table 2 and the charge configuration information of the first network device 110. For example, the charge configuration information of the first network device 110 shows that other operating costs of the first network device 110 is 1 ¥ per 20 G, and the terminal device 150-1 may have a 10% discount and the terminal device 150-2 may have a 20% discount. In this example, the third network device 140 may determine: in the time period from 6:00 to 22:00, the charge on the terminal device 150-1 is 0.945 ¥/G and the charge on the terminal device 150-2 is 0.84 ¥/G; in the time period from 22:00 to 6:00, the charge on the terminal device 150-1 is 0.5 ¥/G and the charge on the terminal device 150-2 is 0.44 ¥/G.

The third network device 140 broadcasts the charging information with respect to the terminal device 150 to the terminal device 150. For example, the third network device may broadcast to the terminal device 150-1 that the charge is 0.945 ¥/G within the time period from 6:00 to 22:00 and the charge is 0.5 ¥/G within the time period from 22:00 to 6:00; and broadcast to the terminal device 150-2 that the charge is 0.84 ¥/G within the time period from 6:00 to 22:00 and the charge is 0.44 ¥/G within the time period from 22:00 to 6:00. In this way, it enables the terminal device to utilize resources during off-peak time. It may be understood that where the communication device 130 is a terminal device, the third network device 140 may also determine the charging information with respect to the communication device 130 and broadcast the charging information to the communication device 130.

In other embodiments, the third network device 140 may also broadcast to the terminal device 150 charging information that comprises an additional condition. For example, the third network device 140 may broadcast to the terminal device 150-1 that the charge is 0.45 ¥/G within the time period from 22:00 to 6:00 in the last week every month.

Figure 3:
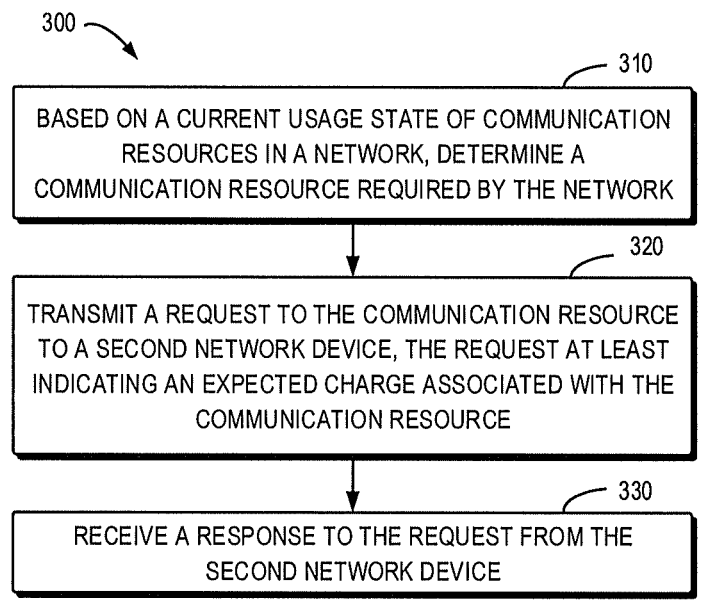
FIG. 3 shows a flow chart of an example method according to some embodiments of the present disclosure.

FIG. 3 shows a flowchart of a method 300 according to the embodiments of the present disclosure. The method 300 shown in FIG. 3 may be implemented at the first network device 110 shown in FIG. 1.

At block 310, the first network device 110 determines a communication resource required by a network based on a current usage state communication resources in the network. In some embodiments, the first network device 110 may monitor traffic of the communication device 130. The first network device 110 may determine whether the traffic of the communication device 130 is higher than predetermined throughput. If the traffic of the communication device 130 is higher than the predetermined throughput, the first network device 110 may determine a communication resource required by the network.

In other embodiments, the first network device 110 may receive a request on a certain service from the communication device 130. If the first network device 110 does not support the service, then the first network device 110 may determine the resource required for supporting the service.

At block 320, the first network device 110 transmits a request on the communication resource to the second network device 120. The request indicates an expected charge associated with the communication resource. Alternatively or in addition, the request may indicate its valid time. The expected charge may be determined based on information which is pre-configured to the first network device 110.

In some embodiments, a condition for triggering the resource request may also be pre-configured to the first network device 110. In other embodiments, the condition for triggering the resource request may be stored in a remote storage device which is accessible to the first network device 110, and the first network device 110 may download the condition for triggering the resource request and save it in a local storage device.

At block 330, the first network device 110 receives a response to the request from the second network device 120. In some embodiments, the response may indicate resource authorization information. In other embodiments, the response may indicate an acceptable charge of the second network device 120.

In some embodiments, the first network device 110 may negotiate the expected charge with the second network device 120 based at least in part on the response. In some embodiments, if the response indicates the resource authorization information, the first network device 110 may transmit an acknowledgement to the response to the second network device 120.

In an example embodiment, if the response indicates an acceptable charge of the second network device 120, the first network device 110 may determine whether acceptable charging information exceeds a predetermined threshold. The predetermined threshold may be pre-configured to the first network device 110. In other embodiments, the predetermined threshold may be stored in a remote storage device accessible to the first network device 110, and the first network device 110 may download the predetermined threshold and save it in a local storage device.

If the acceptable charging information of the second network device 120 exceeds the predetermined threshold, the first network device 110 may transmit further expected charge information to the second network device 120.

In some embodiments, if the traffic of the communication device 130 is lower than the predetermined throughput of the network, the first network device 110 may determine a communication resource to be released by the network. The first network device 110 may transmit to the second network device 120 a release request on the communication resource to be released.

Figure 4:
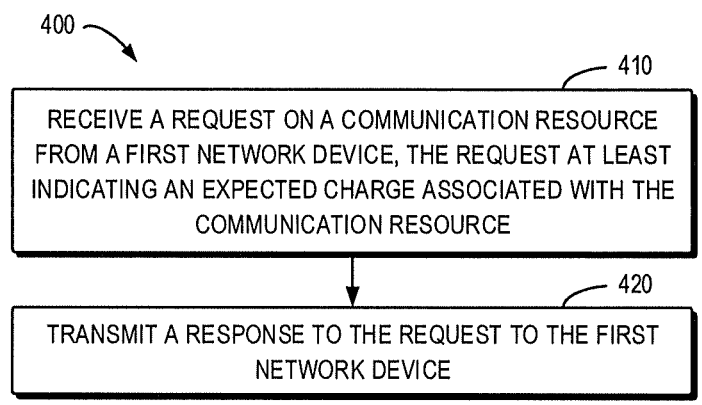
FIG. 4 shows a flow chart of an example method according to some embodiments of the present disclosure.

FIG. 4 shows a flowchart of a method 400 according to embodiments of the present disclosure. The method 400 shown in FIG. 4 may be implemented at the second network device 120 shown in FIG. 1.

At block 410, the second network device 120 receives a request on a communication resource from the first network device 110. The first network device 110 determines the communication resource required by a network based on a current usage state of communication resources in the network.

The request indicates an expected charge associated with the communication resource. Alternatively or in addition, the request may indicate its valid time. The expected charge may be determined based on information which is pre-configured to the first network device 110.

At block 420, the second network device 120 transmits a response to the request to the first network device 110 based on the expected charge. In some embodiments, the second network device 120 may determine whether the expected charge is lower than a predetermined threshold. The predetermined threshold may be stored in a remote storage device accessible to the second network device 120, and the second network device 120 may download a condition for triggering the resource request and save it at a local storage device. The predetermined threshold may also be pre-configured to the second network device 120.

If the expected charge is not lower than the predetermined threshold, the second network device 120 may transmit to the first network device 110 a response indicating resource authorization information. If the expected charge is lower than the predetermined threshold, the second network device 120 may transmit to the first network device 110 a response indicating an acceptable charge of the second network device 120.

In some embodiments, the second network device 120 may negotiate the expected charge with the first network device 110. The negotiation may be at least partly based on the response. In some embodiments, the second network device 120 may receive an acknowledgement with respect to the response from the first network device 110. In other embodiments, the second network device 120 may receive a further expected charge from the first network device 110.

In some embodiments, the second network device 120 may determine whether the further charge is lower than the predetermined threshold. If the further expected charge is not lower than the predetermined threshold, the second network device 120 may transmit to the first network device 110 a response indicating resource authorization information. If the further expected charge is lower than the predetermined threshold, the second network device 120 may transmit to the first network device 110 a response indicating a further acceptable charge of the second network device 120.

Additionally or alternatively, the second network device 120 may also store the request and generate resource provisioning advice based on the stored request.

In other embodiments, if the second network device 120 receives from the first network device 110 a release request on a to-be-released communication resource, the second network device 120 may transmit a response to the release request to the first network device 110.

Figure 5:
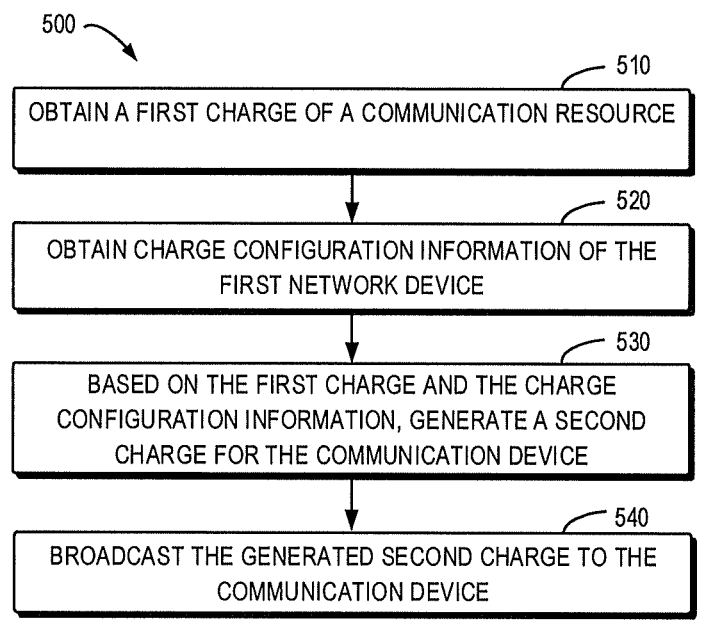
FIG. 5 shows a flow chart of an example method according to some embodiments of the present disclosure.

FIG. 5 shows a flowchart of a method 500 according to embodiments of the present disclosure. The method 500 shown in FIG. 5 may be implemented at the third network device 140 shown in FIG. 1. In other embodiments, the method 500 may also be implemented at the first network device 110 shown in FIG. 1. For the purpose of illustration only, the method 500 is described as being implemented at the third network device 140.

At block 510, the third network device 140 obtains a first charge for a communication resource. The communication resource is a communication resource requested by the first network device 110 from the second network device 120. The first charge is a charge through negotiation between the first network device 110 and the second network device 120.

At block 520, the third network device 140 obtains charge configuration information of the first network device 110. The charge configuration information is related to the terminal device 150. For example, the charge configuration information may comprise cost information of an operator. In addition or alternatively, the charge information may also comprise charging information for the terminal device 150 in the operator network. For example, the charge information may indicate which communication device may obtain a charge discount, the percentage of the discount and the like. It may be understood that the charge information may further comprise any other charging information, such as stepwise charging information and the like.

At block 530, the third network device 140 generates a second charge for the terminal device 150 based on the first charge and the charge configuration information. For example, Table 2 above shows the second charge for the terminal device 150. It may be understood that charges shown in Table 2 are merely exemplary and not limiting.

At block 540, the third network device 140 broadcasts the generated charging information to the terminal device 150. In some embodiments, the third network device 140 may be broadcast in a traditional way, such as a text message. Alternatively or additionally, the third network device 140 may also be conveyed to the terminal device 150 via a subscription message. In some embodiments, the third network device 140 may broadcast the generated charging information to all communication devices in the operator network. In other embodiments, the third network device 140 may also broadcast the charging information to a terminal device that has subscribed to the charging information.

In some embodiments, an apparatus (for example, the first network device 110) capable of performing the method 300 may comprise corresponding means for performing respective steps of the method 300. These means may be implemented in any appropriate way, for example, may be implemented as circuit or software modules.

In some embodiments, the communication apparatus comprises means for determining, at the first network device, a communication resource needed by a network based on a current usage state of communication resources in the network. The communication apparatus further comprises means for transmitting a request on the communication resource to the second network device, the request at least indicating an expected charge associated with the communication resource. The communication apparatus also comprises means for receiving a response to the request from the second network device.

In some embodiments, the means for determining the communication resource required by the network comprises: means for monitoring traffic of a terminal device in the network; and means for, in response to the traffic being higher than predetermined throughput of the network, determining a communication resource required by the network.

In some embodiments, the means for determining the communication resource required by the network comprises: means for receiving a request on a service from a terminal device in the network; means for, in response to the first network device not supporting the service, determining the communication resource required by the network to support the service.

In some embodiments, the apparatus further comprises: means for transmitting to the second network device an indication of a valid time of the request.

In some embodiments, the communication apparatus further comprises means for based at least in part on the response, negotiating the expected charge with the second network device. In some embodiments, the means for negotiating comprises: means for in response to that the response indicates the expected charge is acceptable, transmitting, to the second network device, an acknowledgement to the response.

In some embodiments, the means for negotiating comprises: means for in response to that response indicates an acceptable charge of the second network device, determining whether the acceptable charge exceeds a predetermined threshold; and means for in response to the acceptable charge exceeding the predetermined threshold, transmitting a further expected charge to the second network device.

In some embodiments, the apparatus further comprises: means for monitoring traffic of a terminal device in the network; means for, in response to the traffic being lower than predetermined throughput of the network, determining a communication resource to be released by the network; and means for transmitting a release request on the communication resource to be released to the second network device.

In some embodiments, an apparatus (e.g., the first network device 110) capable of performing the method 400 may comprise corresponding means for performing respective steps of the method 400. These means may be implemented in any appropriate way, e.g., may be implemented as circuit or software modules.

In some embodiments, the communication apparatus comprises: means for receiving, at a second network device, a request on a communication resource from a first communication device, the request at least indicating an expected charge associated with the communication resource, the communication resource being determined based on a current usage state of communication resources in a network. The communication apparatus further comprises: means for transmitting a response to the request to the first network device based on the expected charge.

In some embodiments, the apparatus comprises means for receiving an indication of valid time of the request from the first network device.

In some embodiments, the means for sending the response to the request to the first network device comprises: means for determining whether the expected charge is lower than a predetermined threshold; means for, if the expected charge is not lower than the predetermined threshold, transmitting to the first network device 110 a response indicating resource authorization information; and means for, if the expected charge is lower than the predetermined threshold, transmitting to the first network device a response indicating an acceptable charge of the second network device.

In some embodiments, the communication apparatus further comprises: means for negotiating the expected charge with the first network device, the negotiating being based at least in part on the response. In some embodiments, the means for negotiating comprises: means for receiving an acknowledgement to the response from the first network device.

In other embodiments, the means for negotiating comprises: means for receiving a further expected charge from the first network device; means for determining whether the further charge is lower than the predetermined threshold; means for, if the further expected charge is not lower than the predetermined threshold, transmitting to the first network device a response indicating resource authorization information; and means for, if the further expected charge is lower than the predetermined threshold, transmitting to the first network device a response indicating a further acceptable charge of the second network device.

Additionally or alternatively, the apparatus further comprises: means for storing a request; and means for generating a resource provisioning advice based on the stored request.

In other embodiments, the apparatus further comprises: means for, in response to receiving a release request on a communication resource to be released from the first network device, transmitting a response to the release request to the first network device.

In some embodiments, an apparatus (e.g., the third network device 140) capable of performing the method 500 may comprise corresponding means for performing respective steps of the method 500. These means may be implemented in any appropriate way, e.g., may be implemented as circuit or software modules.

In some embodiments, the apparatus comprises means for obtaining a first charge for a communication resource. The communication resource is a communication resource requested by the first network device from the second network device. The first charge is a charge through negotiation between the first network device and the second network device.

In some embodiments, the apparatus further comprises means for obtaining charge configuration information of the first network device. The charge configuration information is related to the terminal device. For example, the charge configuration information may comprise cost information of an operator. Additionally or alternatively, the charging information may also comprise charging information for the terminal device 150 in the operator network. For example, the charging information may indicate which communication device may obtain a charge discount, the percentage of the discount, etc. It may be understood that the charging information may further comprise any other charging information, such as stepwise charging information, etc.

In some embodiments, the apparatus further comprises means for generating a second charge for the terminal device based on the first charge and the charge configuration information.

In some embodiments, the apparatus further comprises means for broadcasting the generated second charge to the communication device.

Figure 6:
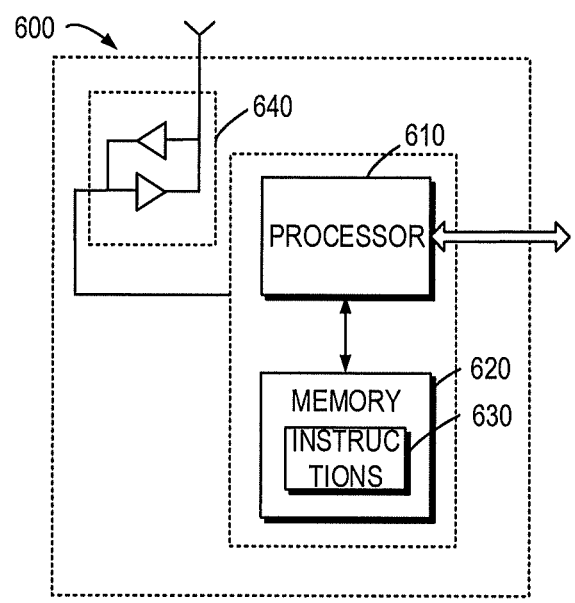
FIG. 6 shows a block diagram of a communication device according to some embodiments of the present disclosure.

FIG. 6 is a block diagram of a device 600 according to the embodiments of the present disclosure. As depicted, the device 600 includes one or more processors 610, one or more memories 620 coupled to the processor(s) 610, and one or more transmitters and/or receivers (TX/RX) 640 coupled to the processor 610.

The processor 610 may be of any type suitable to the local technical environment, and may include one or more of the following: general-purpose computers, special-purpose computers, microprocessors, digital signal controllers (DSPs), and processors based on multicore processor architecture. The device 600 may include multiple processors, such as an application specific integrated circuit chip that is slaved in time to a clock which synchronizes the main processor.

The memory 620 may be of any type suitable to the local technical environment and may be implemented using any appropriate data storage technique, as non-limiting examples, such as a non-transitory computer-readable storage medium, a semiconductor-based storage device, a magnetic memory device and system, an optical memory device and system, an unremovable memory and a removable memory.

The memory 620 stores at least one part of an instruction 630. The TX/RX 640 is used for two-way communication. The TX/RX 640 has at least one antenna for facilitating communication. The TX/RX 640 may support optical fiber communication. The communication interface may represent any interface necessary for communication with other devices.

The instruction 630 are assumed to include program instructions, which, when executed by the associated processor 610, cause the device 600 to perform implementations of the present disclosure as discussed with reference to FIGS. 2 to 5. That is, the implementations of the present disclosure may be effected by computer software executable to the processor 610 of the device 600 or by a combination of software and hardware.

Generally, various example embodiments of the present disclosure may be implemented in hardware or special purpose circuits, software, logic, or any combination thereof. Some aspects may be implemented in hardware, while other aspects may be implemented in firmware or software that may be executed by a controller, microprocessor, or other computing devices. While various aspects of embodiments of the present disclosure are illustrated and described as block diagrams, flowcharts, or using some other pictorial representations, it is to be understood that the blocks, devices, systems, techniques, or methods described herein may be implemented in, as non-limiting examples, hardware, software, firmware, special-purpose circuits or logic, general purpose hardware or a controller or other computing devices, or some combination thereof.

As one example, the embodiments of the present disclosure may be described in the context of machine-executable instructions, such as those included in program modules, which are executed in a device on a target real or virtual processor. Generally speaking, the program modules include a routine, a program, a library, an object, a class, a component, a data structure, etc., which perform a particular task or implement a particular abstract data structure. In various exemplary embodiments, functions of the program modules may be merged or divided between the described program modules. Machine-executable instructions for program modules can be executed locally or in distributed devices. In distributed devices, the program modules may be located in both a local storage medium and a remote storage medium.

Computer program codes for implementing the method of the present disclosure may be written in one or more programming languages. These computer program codes may be provided to a processor of a general-purpose computer, a special-purpose computer, or other programmable data processing apparatus, so that the program codes, when executed by the computer or other programmable data processing apparatus, cause the functions/operations specified in the flowchart and/or block diagram to be implemented. The program codes may execute entirely on a computer, partly on a computer, as an independent software package, partly on a computer and partly on a remote computer, or entirely on a remote computer or server.

In the context of the present disclosure, the computer program codes or related data may be carried by any suitable carrier to cause a device, an apparatus, or a processor to perform various processes and operations as described above. Examples of carriers include a signal, a computer-readable medium, and the like.

Examples of the signal may include an electrical signal, an optical signal, radio, sound, or propagated signals in other forms, such as a carrier wave, an infrared signal, and the like.

In the context of the present disclosure, the machine-readable medium may be any tangible medium containing or storing a program used for or related to an instruction executing system, an apparatus or a device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination thereof. More detailed examples of the machine-readable storage medium include an electrical connection with one or multiple wires, a portable computer magnetic disk, a hard disk, a random access memory (RAM), a read-only memory (ROM), an erasable programmable ROM (EPROM or flash memory), an optical storage device, a magnetic storage device, or any suitable combination thereof.

In addition, although the operations are depicted in a particular order, this should not be construed as requiring or suggesting that such operations are required to be performed in the particular order or that all illustrated operations are required to be performed to achieve desirable results. On the contrary, the steps depicted in the flowchart may be performed in a different order. Additionally or alternatively, some steps may be omitted, a plurality of steps may be combined into one step, and/or one step may be decomposed into a plurality of steps. Further, it should be noted that features and functions of two or more apparatuses of the present disclosure may be embodied in one apparatus, and vice versa, features and functions of one apparatus may further be embodied in a plurality of apparatuses.

Although the present disclosure has been described with reference to several embodiments, it should be understood that the present disclosure is not limited to the specific embodiments disclosed herein. The present disclosure is intended to cover various modifications and equivalent arrangements included within the spirit and scope of the claims as appended.

I claim:

1. A communication method, comprising:
   determining, at a first network device, a communication resource required by a network based on a current usage state of communication resources in the network;
   transmitting a resource request on the communication resource to a second network device, the request at least indicating an expected charge associated with the communication resource,
   wherein the resource request comprises at least one combination of at least one of an expected charge for a resource request, a quantity of requested resources, and a frequency of resource requests; and
receiving a response to the request from the second network device,
wherein the response is based on a determination that the expected charge indicated in the resource request is not acceptable, and
wherein determining the communication resource required by the network comprises:
monitoring traffic of a communication device in the network;
send towards the second network device a resource request comprising a channel predetermined throughput;
based on the response, using charging information to trigger a charge negotiation process; and
based on at least one negotiation round of the charge negotiation process, determining a further expected charge that is acceptable or not acceptable for the first network device and the second network device,
wherein based on the further expected charge being acceptable the further expected charge is used by the second network device, and
wherein no matter whether the charge negotiation process succeeds or not, the charge negotiation process is terminated based on a number of the at least one negotiation round reaching a predetermined number.

2. The method of claim 1, comprising:
receiving a request on a service from a communication device in the network; and
in response to the first network device currently not supporting the service, determining the communication resource required by the network so as to support the service.

3. The method of claim 1, further comprising:
transmitting an indication of valid time of the resource request to the second network device.

4. The method of claim 1, further comprising:
based at least in part on the response, negotiating the expected charge with the second network device.

5. The method of claim 4, wherein the negotiating comprises:
in response to that response indicates an acceptable charge of the second network device, determining whether the acceptable charge exceeds a predetermined threshold; and
in response to the acceptable charge exceeding the predetermined threshold, transmitting a further expected charge to the second network device.

6. A communication method, comprising:
receiving, at a second network device, a resource request comprising a channel predetermined throughput on a communication resource from a first communication device, the resource request at least indicating an expected charge associated with the communication resource, the communication resource being determined based on a current usage state of communication resources in a network,
wherein the resource request comprises at least one combination of at least one of an expected charge for a resource request, a quantity of requested resources, and a frequency of resource requests;
determine the expected charge indicated in the resource request is acceptable or not,
wherein determining whether the expected charge is acceptable or unacceptable based on a communication resource required by the first communication device,
wherein the communication resource required by the first communication device comprises:
monitoring traffic of a communication device in the network;
in response to the traffic being higher than predetermined throughput of the network, receive from the second network device charging information to trigger a charge negotiation process; and
based on at least one negotiation round of the charge negotiation process, determining a further expected charge that is acceptable or not acceptable for the first network device and the second network device; and
transmitting a response to the resource request to the first network device based on the expected charge,
wherein based on the further expected charge being acceptable the further expected charge is used by the second network device, and
wherein no matter whether the charge negotiation process succeeds or not, the charge negotiation process is terminated based on a number of the at least one negotiation round reaching a predetermined number.

7. The method of claim 6, further comprising:
receiving an indication of valid time of the resource request from the first network device.

8. The method of claim 6, wherein transmitting the response to the resource request to the first network device comprises:
determining whether the expected charge is lower than a predetermined threshold;
if the expected charge is not lower than the predetermined threshold, transmitting the response to the first network device, the response indicating resource authorization information; and
if the expected charge is lower than the predetermined threshold, transmitting the response to the first network device, the response indicating an acceptable charge of the second network device.

9. The method of claim 6, further comprising:
negotiating the expected charge with the first network device, the negotiating being based at least in part on the response.

10. The method of claim 6, wherein the negotiating comprises:
receiving an acknowledgement to the response from the first network device.

11. The method of claim 6, wherein the negotiating comprises:
receiving a further expected charge from the first network device;
determining whether the further expected charge is lower than the predetermined threshold;
if the further expected charge is not lower than the predetermined threshold, transmitting the response to the first network device, the response indicating resource authorization information; and
if the further expected charge is lower than the predetermined threshold, transmitting the response to the first network device, the response indicating a further acceptable charge of the second network device.

12. The method of claim 6, further comprising:
in response to receiving a release request on a communication resource to be released from the first network device, transmitting, to the first network device, a response to the release request.

13. A network device, comprising:
at least one processor; and at least one non-transitory memory coupled to the at least one processor, the memory storing instructions which, when executed by the at least one processor, cause the network device to perform;

determining, at a first network device, a communication resource required by a network based on a current usage state of communication resources in the network;

transmitting a resource request on the communication resource to a second network device, the request at least indicating an expected charge associated with the communication resource, wherein the resource request comprises at least one combination of at least one of an expected charge for a resource request, a quantity of requested resources, and a frequency of resource requests; and receiving a response to the request from the second network device, wherein the response is based on a determination that the expected charge indicated in the resource request is not acceptable, and wherein determining the communication resource required by the network comprises: monitoring traffic of a communication device in the network;

sending towards the second network device a resource request comprising a channel predetermined throughput; based on the response, using charging information to trigger a charge negotiation process; and based on at least one negotiation round of the charge negotiation process, determining a further expected charge that is acceptable or not acceptable for the first network device and the second network device, wherein based on the further expected charge being acceptable the further expected charge is used by the second network device, and wherein no matter whether the charge negotiation process succeeds or not, the charge negotiation process is terminated based on a number of the at least one negotiation round reaching a predetermined number.

14. A network device, comprising:

at least one processor; and at least one non-transitory memory coupled to the at least one processor, the memory storing instructions which, when executed by the at least one processor, cause the network device to perform a method according to claim 6.

15. A non-transitory computer-readable medium having instructions stored thereon, the instructions, when executed by at least one processing unit of a machine, cause the machine to perform a method according to claim 1.

16. A non-transitory computer-readable medium having instructions stored thereon, the instructions, when executed by at least one processing unit of a machine, cause the machine to perform a method according to claim 6.

* * * * *